United States Patent
Fujita

(10) Patent No.: US 11,631,924 B2
(45) Date of Patent: Apr. 18, 2023

(54) BUSBAR AND BATTERY STACK

(71) Applicant: Panasonic Intellectual Property Management Co., Ltd., Osaka (JP)

(72) Inventor: Goro Fujita, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 548 days.

(21) Appl. No.: 16/613,835

(22) PCT Filed: Jul. 5, 2018

(86) PCT No.: PCT/JP2018/025521
§ 371 (c)(1),
(2) Date: Nov. 15, 2019

(87) PCT Pub. No.: WO2019/017211
PCT Pub. Date: Jan. 24, 2019

(65) Prior Publication Data
US 2020/0168880 A1    May 28, 2020

(30) Foreign Application Priority Data
Jul. 18, 2017   (JP) .............. JP2017-139210

(51) Int. Cl.
*H02G 5/02*     (2006.01)
*H01M 50/502*   (2021.01)
*H01M 50/20*    (2021.01)

(52) U.S. Cl.
CPC ......... *H01M 50/502* (2021.01); *H01M 50/20* (2021.01); *H02G 5/02* (2013.01)

(58) Field of Classification Search
CPC .. H01M 10/482; H01M 10/659; H01M 50/20; H01M 50/502; H01M 2/20;
(Continued)

(56) References Cited

U.S. PATENT DOCUMENTS

2009/0274956 A1   11/2009  Kosugi et al.
2010/0015519 A1   1/2010   Trester et al.
(Continued)

FOREIGN PATENT DOCUMENTS

CN   102881855 A        1/2013
JP   H11238498 A  *  8/1999  ............. Y02E 60/10
(Continued)

OTHER PUBLICATIONS

List of thermal conductivities—Wikipedia_pp. 1-16_Feb. 2017.*
(Continued)

*Primary Examiner* — Timothy J Thompson
*Assistant Examiner* — Guillermo J Egoavil
(74) *Attorney, Agent, or Firm* — McDermott Will & Emery LLP

(57) ABSTRACT

A bus bar includes a first heat absorber that is joined to an output terminal of a first battery, a second heat absorber that is joined to an output terminal of a second battery, and a main body that electrically connects the first heat absorber to the second heat absorber. The first heat absorber and the second heat absorber have a heat capacity larger than a heat capacity of the main body. The main body has a first connecting part that is electrically connected to the first heat absorber, a second connecting part that is electrically connected to the second heat absorber, and a displacement absorber that is disposed between the first connecting part and the second connecting part and deforms in response to a relative displacement of the first battery and the second battery.

10 Claims, 5 Drawing Sheets

(58) Field of Classification Search
CPC ............. H01M 50/209; H01M 50/264; H01M 50/296; H01M 50/505; H01M 50/569; H01M 50/528; H01M 2220/20; H02G 5/02; Y02E 60/10
USPC ........... 429/152; 174/16.2, 68.2, 88 B, 70 B, 174/99 B, 129 B, 133 B, 149 B
See application file for complete search history.

(56) References Cited

U.S. PATENT DOCUMENTS

| | | |
|---|---|---|
| 2011/0206948 A1 | 8/2011 | Asai et al. |
| 2012/0019061 A1* | 1/2012 | Nishihara ............ H01M 50/502 429/7 |
| 2013/0017436 A1 | 1/2013 | Kume |
| 2017/0005313 A1 | 1/2017 | Ogawa et al. |
| 2019/0288264 A1 | 9/2019 | Fujita |
| 2020/0106073 A1* | 4/2020 | Fujita ..................... H02G 5/002 |
| 2020/0243830 A1* | 7/2020 | Tanaka ................. H01M 50/543 |

FOREIGN PATENT DOCUMENTS

| | | | |
|---|---|---|---|
| JP | 2008-091183 | 4/2008 | |
| JP | 2008300083 A * | 12/2008 | ............. H01M 2/10 |
| JP | 2009-087761 | 4/2009 | |
| JP | 2011-175743 | 9/2011 | |
| JP | 2012-138239 | 7/2012 | |
| JP | 2012221757 A * | 11/2012 | ............. Y02E 60/10 |
| JP | 2015-050063 A | 3/2015 | |
| JP | 2015-185373 | 10/2015 | |
| KR | 20060018326 A * | 3/2006 | ........ H01M 2220/20 |
| WO | 2017/208804 | 12/2017 | |

OTHER PUBLICATIONS

Thermal Insulation Handbook_pp. 1-58_Apr. 2001.*
International Search Report of PCT application No. PCT/JP2018/025521 dated Oct. 9, 2018.
English Translation of Chinese Office Action dated Jan. 7, 2022 for the related Chinese Patent Application No. 201880040376.1.

* cited by examiner

BUSBAR AND BATTERY STACK

CROSS-REFERENCE TO RELATED APPLICATIONS

This application is a U.S. national stage application of the PCT International Application No. PCT/JP2018/025521 filed on Jul. 5, 2018, which claims the benefit of foreign priority of Japanese patent application 2017-139210 filed on Jul. 18, 2017, the contents all of which are incorporated herein by reference.

TECHNICAL FIELD

The present invention relates to a bus bar and a battery stack.

BACKGROUND ART

For example, for a vehicle and the like, a battery stack formed by connecting a plurality of batteries in series is known as a battery used for a power source that requires high output voltage. Conventionally, in such a battery stack, output terminals of adjacent batteries connect to each other via a bus bar (for example, see PTL 1).

CITATION LIST

Patent Literature

PTL 1: Unexamined Japanese Patent Publication No. 2011-175743

SUMMARY OF THE INVENTION

An earnest investigation of the conventional battery stacks has resulted in the recognition of following problems. That is, two batteries connected to each other via a bus bar may relatively displace due to battery expansion or the like. In order to maintain a stable electrical connection between the two batteries, measures against such a displacement are desired. Also, temperature rise of a battery tends to deteriorate power generation performance. Thus, measures against the temperature rise of the battery are also desired.

The present invention has been accomplished in light of this situation. An object of the present invention is to provide a technique for maintaining a stable electrical connection between batteries and inhibiting deterioration in power generation performance of the battery.

An aspect of the present invention is a bus bar. The bus bar includes a first heat absorber that is joined to an output terminal of a first battery, a second heat absorber that is joined to an output terminal of a second battery adjacent to the first battery, and a main body that electrically connects the first heat absorber to the second heat absorber. The first heat absorber and the second heat absorber have a heat capacity larger than a heat capacity of the main body. The main body has a first connecting part that is electrically connected to the first heat absorber, a second connecting part that is electrically connected to the second heat absorber, and a displacement absorber that is disposed between the first connecting part and the second connecting part and deforms in response to a relative displacement of the first battery and the second battery.

Another aspect of the present invention is a battery stack. The battery stack includes the bus bar in the above aspect, and a plurality of batteries that are electrically connected to each other via the bus bar.

Any combination of the above-described components and converted expressions of the present invention in methods, apparatuses, systems, and the like are still effective as aspects of the present invention.

The present invention makes it possible to maintain a stable electrical connection between batteries and to inhibit deterioration in power generation performance of the battery.

DESCRIPTION OF EMBODIMENT

Figure 1:
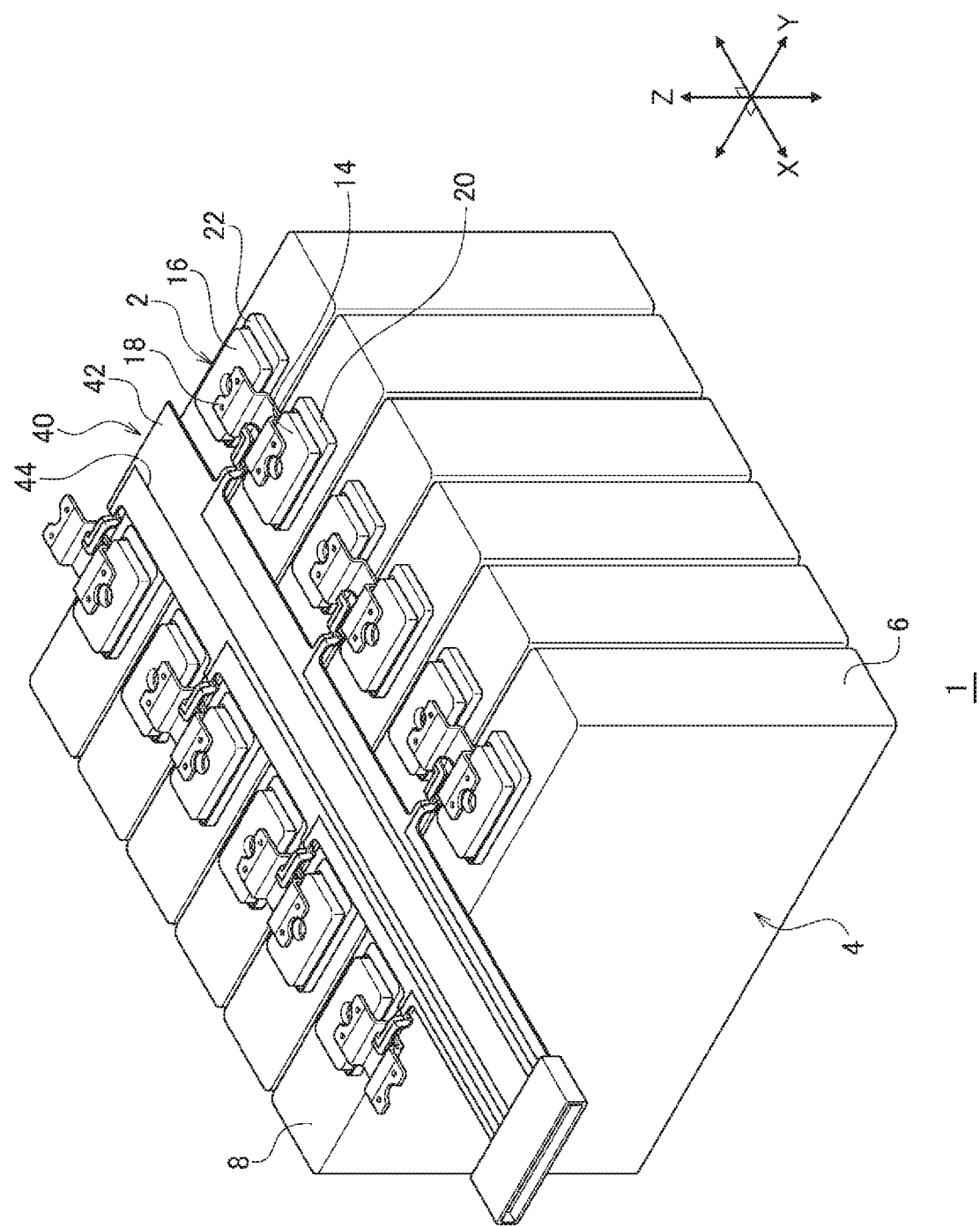
FIG. 1 is a perspective view illustrating a schematic structure of a battery stack including a bus bar according to an exemplary embodiment.

Hereinafter, the present invention will be described based on a preferred exemplary embodiment with reference to the drawings. The exemplary embodiment is an exemplification and does not limit the invention. All features described in the exemplary embodiment and combinations of the features are not necessarily essential to the invention. The same reference marks are assigned to the same or equivalent components, members, and processes illustrated in the drawings. Explanation for the same or equivalent components, members, and processes will not be repeated as appropriate. For convenience, scales or shapes of parts illustrated in the drawings are determined to facilitate explanation. The scales or shapes of parts should not be interpreted as limitation unless otherwise mentioned. Further, terms "first", "second", and the like, when used in the present description and claims, do not mean any order or importance unless otherwise mentioned, but are intended to distinguish between one configuration and another configuration.

Figure 2:
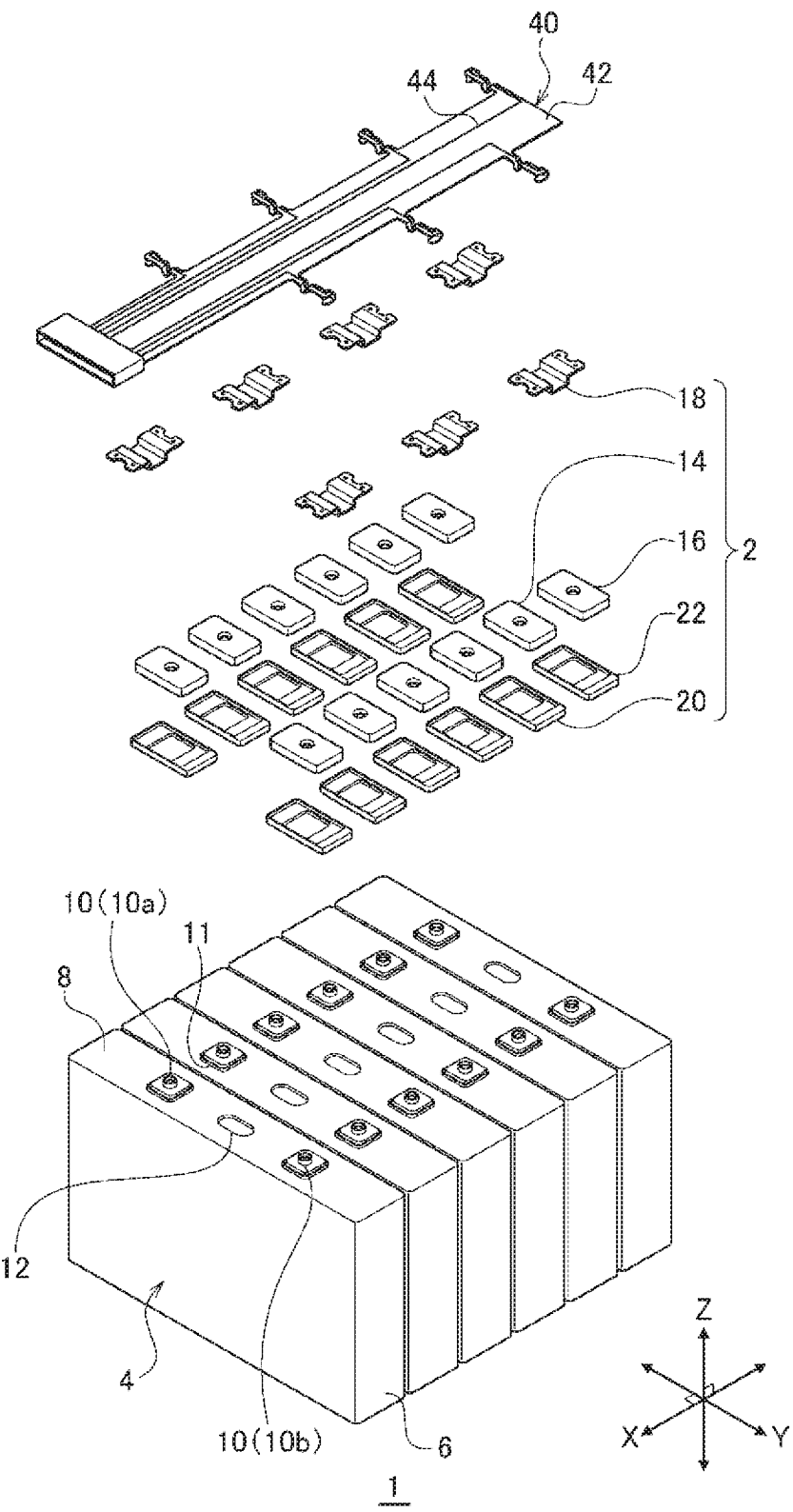
FIG. 2 is an exploded perspective view of the battery stack.

FIG. 1 is a perspective view illustrating a schematic structure of a battery stack including a bus bar according to an exemplary embodiment. FIG. 2 is an exploded perspective view of the battery stack. Note that illustration of a separator is omitted in FIGS. 1 and 2. Battery stack 1 includes bus bar 2, a plurality of batteries 4 that are electrically connected to each other via bus bar 2, and voltage detector 40. In the present exemplary embodiment, for example, six batteries 4 are connected in series via bus bars 2 to form battery stack 1.

For example, each battery 4 is a rechargeable secondary battery, such as a lithium-ion battery, a nickel-hydrogen battery, or a nickel-cadmium battery. Battery 4 is a so-called prismatic battery, and has exterior can 6 with a flat rectangular parallelepiped shape. Exterior can 6 has a substantially rectangular opening (not illustrated) provided on one surface of exterior can 6. An electrode assembly, an electrolyte, and the like are put into exterior can 6 through this opening. The opening of exterior can 6 is provided with sealing plate 8 that seals exterior can 6.

There are output terminal 10 of a positive electrode near one end of sealing plate 8 in a longitudinal direction, and output terminal 10 of a negative electrode near the other end of sealing plate 8. Hereinafter, output terminal 10 of a positive electrode is referred to as positive-electrode terminal 10a, and output terminal 10 of a negative electrode is referred to as negative-electrode terminal 10b, as appropriate. When there is no need to distinguish polarities of output terminals 10, positive-electrode terminal 10a and negative-electrode terminal 10b are collectively referred to as output terminals 10. Output terminal 10 protrudes from an opening of sealing plate 8.

Gasket 11 as a seal member is disposed between a periphery of output terminal 10 and the opening of sealing plate 8. Gasket 11 airtightly closes a boundary between sealing plate 8 and output terminal 10. Gasket 11 prevents a short circuit between sealing plate 8 and output terminal 10. Exterior can 6, sealing plate 8, and output terminal 10 are electric conductors and are made of metal, for example. Gasket 11 is an insulator and is made of resin, for example.

In the present exemplary embodiment, assume that a side on which sealing plate 8 is provided serves as a top surface of battery 4, and the opposite side serves as a bottom surface of battery 4. Further, battery 4 has two main surfaces connecting the top surface to the bottom surface. This main surface has a largest area among six surfaces of battery 4. Two surfaces other than the top surface, the bottom surface, and the two main surfaces serve as side surfaces of battery 4. A top-surface side of battery 4 serves as a top surface of battery stack 1, and a bottom-surface side of battery 4 serves as a bottom surface of battery stack 1. For convenience, assume that a top-surface side of battery stack 1 indicates a vertically upward direction, and a bottom-surface side of battery stack 1 indicates a vertically downward direction.

In sealing plate 8, safety valve 12 is disposed between a pair of output terminals 10. Safety valve 12 can open to release internal gas when pressure in exterior can 6 rises to be higher than or equal to a predetermined value. Safety valve 12 of each battery 4 connects to a gas duct (not illustrated). Exhaust gas from safety valve 12 is exhausted to the gas duct.

A plurality of batteries 4 are stacked at predetermined intervals with the main surfaces of adjacent batteries 4 facing each other. The term "stack" means an arrangement of a plurality of members in any one direction. Therefore, stacking batteries 4 includes arranging a plurality of batteries 4 in a horizontal direction. Further, each battery 4 is disposed such that output terminal 10 faces in an identical direction (for convenience herein, vertically upward direction). Two adjacent batteries 4 are stacked such that positive-electrode terminal 10a of one of batteries 4 is adjacent to negative-electrode terminal 10b of the other of batteries 4. Positive-electrode terminal 10a and negative-electrode terminal 10b are electrically connected to each other via bus bar 2. Output terminals 10 of the same polarity of two adjacent batteries 4 may be connected to each other via bus bar 2

Bus bar 2 has first heat absorber 14, second heat absorber 16, and main body 18 as a main configuration. One end side of bus bar 2 electrically connects to positive-electrode terminal 10a of one of batteries 4. The other end side of bus bar 2 electrically connects to negative-electrode terminal 10b of the other of batteries 4. Voltage detector 40 detects voltages of the plurality of batteries 4. Voltage detector 40 has substrate 42 and a plurality of voltage detection lines 44. Structures of bus bar 2 and voltage detector 40 will be described in detail later.

Battery stack 1 has a plurality of separators (not illustrated). The separator is also called an insulating spacer, and is made of resin having an insulation property, for example. The separator is disposed between batteries 4, and between battery 4 and an end plate described below. This separator insulates exterior cans 6 of adjacent batteries 4 from each other. This separator also insulates exterior can 6 of battery 4 from the end plate.

Battery stack 1 is sandwiched between a pair of end plates (not illustrated). Each end plate is disposed so as to be adjacent to outermost battery 4. The end plate is made of a metal sheet, for example. An external connection terminal (not illustrated) is attached to the end plate via an insulation member. The external connection terminal of the end plate and outermost battery 4 are electrically connected to each other via bus bar 2. For example, one end side of bus bar 2 electrically connects to output terminal 10 that is a termination of the series connection of batteries 4. The other end side of bus bar 2 electrically connects to the external connection terminal of the end plate. The external connection terminal connects to an external load via a wire leading to the outside of battery stack 1.

Battery stack 1 and the pair of end plates are restrained by a pair of restraint members (not illustrated). The pair of restraint members are also called bind bars. The pair of restraint members are arrayed in horizontal direction Y perpendicular to stacking direction X of the plurality of batteries 4. Each restraint member has a first part extending in stacking direction X of batteries 4 and two second parts protruding from both ends of the first part to a battery stack 1 side. The two second parts face each other in stacking direction X. The restraint member can be formed by folding ends of a metal sheet, for example.

The two second parts and the pair of end plates are fixed with screws or the like, which makes the pair of end plates and the pair of restraint members bind the plurality of batteries 4 and the plurality of separators. The separator, the end plate, and the restraint member have publicly known structures, and thus more detailed description will be omitted.

Figure 3:
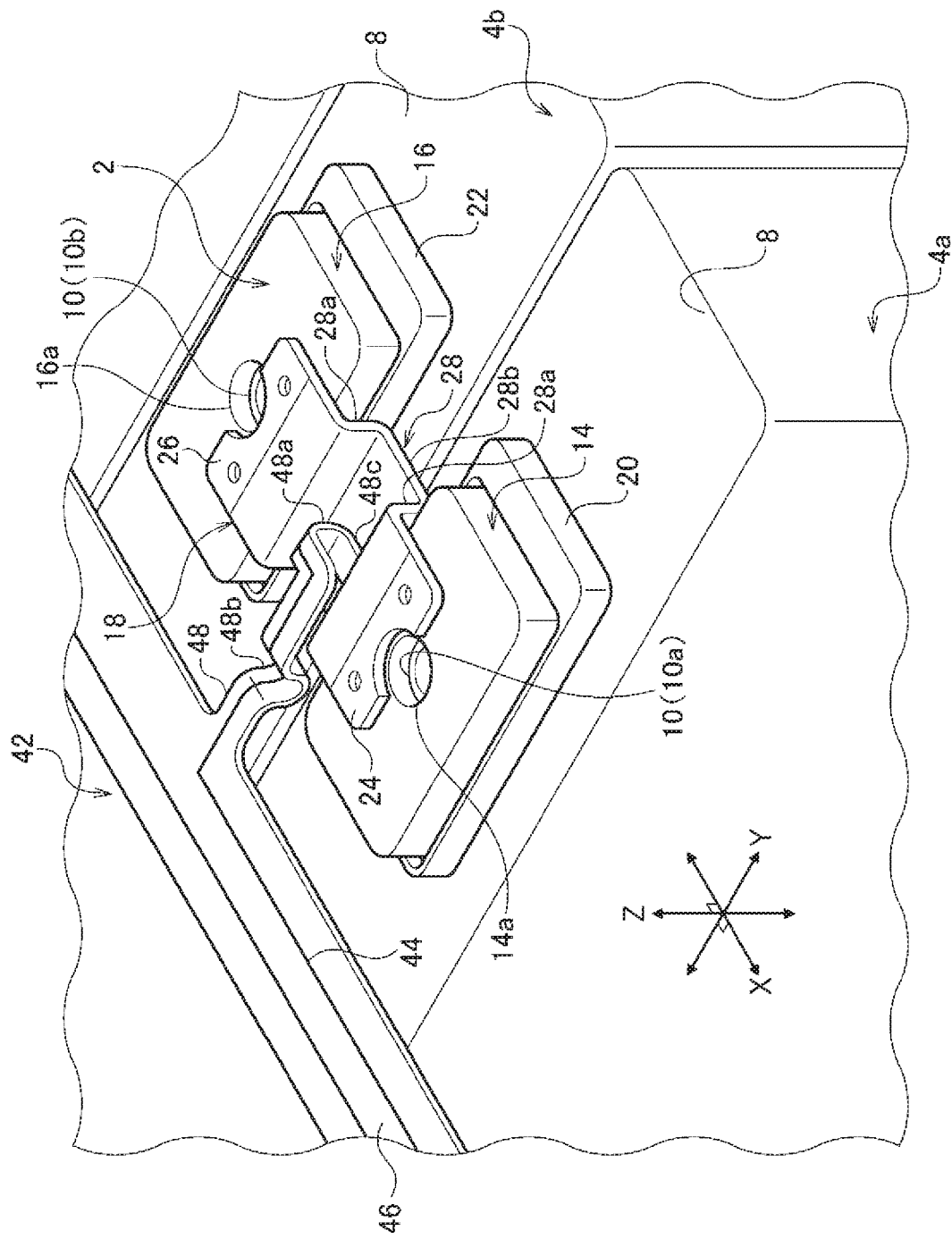
FIG. 3 is a perspective view illustrating an enlarged region including the bus bar of the battery stack.
Figure 4A:
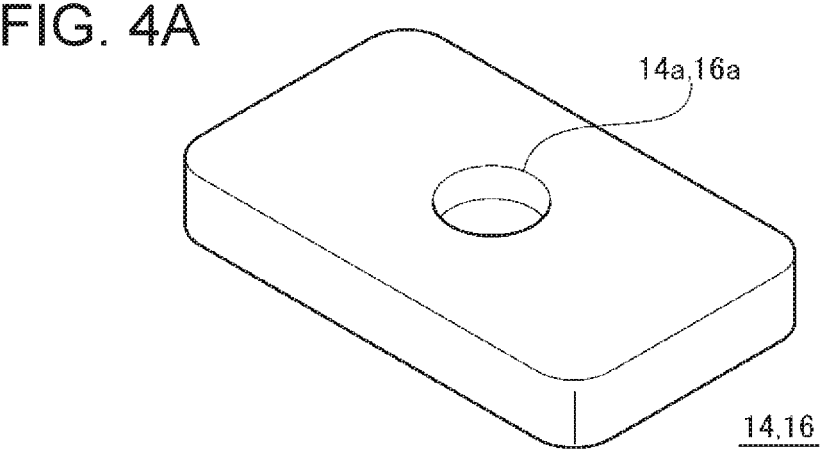
FIG. 4A is a perspective view illustrating a schematic structure of a first heat absorber and a second heat absorber.
Figure 4B:
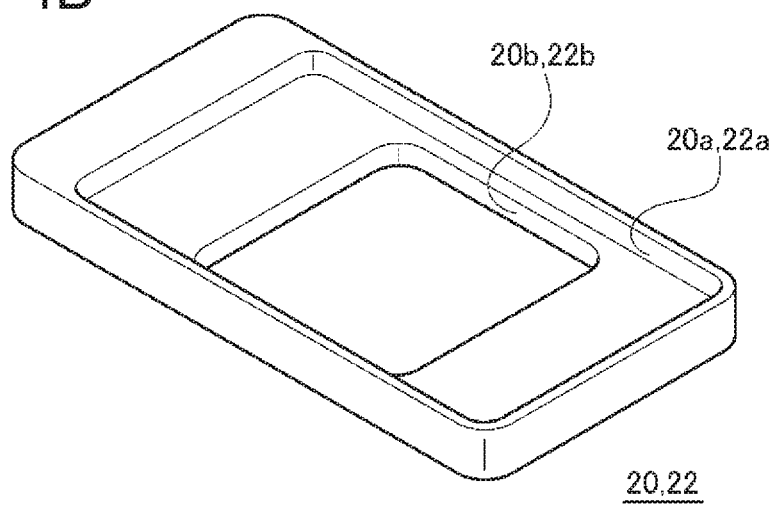
FIG. 4B is a perspective view illustrating a schematic structure of a first insulator and a second insulator.
Figure 4C:
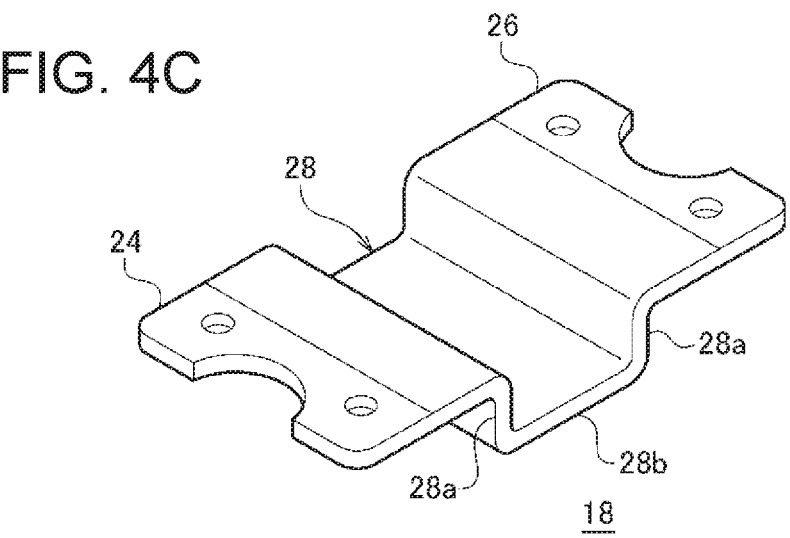
FIG. 4C is a perspective view illustrating a schematic structure of a main body.

Subsequently, bus bar 2 according to the present exemplary embodiment will be described in detail. FIG. 3 is a perspective view illustrating an enlarged region including the bus bar of the battery stack. FIG. 4A is a perspective view illustrating a schematic structure of a first heat absorber and a second heat absorber. FIG. 4B is a perspective view illustrating a schematic structure of a first insulator and a second insulator. FIG. 4C is a perspective view illustrating a schematic structure of a main body. FIG. 3 illustrates a region where first battery 4a and second battery 4b that are adjacent to each other in battery stack 1 are connected to each other via bus bar 2. Illustration of a separator is omitted.

Bus bar 2 includes first heat absorber 14, second heat absorber 16, and main body 18. Bus bar 2 according to the present exemplary embodiment further includes first insulator 20 and second insulator 22. First heat absorber 14, second heat absorber 16, main body 18, first insulator 20, and second insulator 22 are configured with separate members. First heat absorber 14 and second heat absorber 16 have a substantially equal structure. First insulator 20 and second insulator 22 have a substantially equal structure.

First heat absorber 14 is joined to output terminal 10 of first battery 4a. Second heat absorber 16 is joined to output terminal 10 of second battery 4b adjacent to first battery 4a. First heat absorber 14 and second heat absorber 16 are electric conductors and are made of metal, for example. First heat absorber 14 and second heat absorber 16 are flat and substantially rectangular-parallelepiped-shaped, and have through-holes 14a, 16a, respectively. Through-hole 14a extends from one main surface to the other main surface of first heat absorber 14. Similarly, through-hole 16a extends from one main surface to the other main surface of second heat absorber 16.

First heat absorber 14 is joined to output terminal 10 of first battery 4a by welding, for example, with output terminal 10 inserted in through-hole 14a. Second heat absorber 16 is joined to output terminal 10 of second battery 4b by welding, for example, with output terminal 10 inserted in through-hole 16a. Thus, one main surface of first heat absorber 14, in other words, a bottom surface, faces sealing plate 8 of first battery 4a. One main surface of second heat absorber 16, in other words, a bottom surface, faces sealing plate 8 of second battery 4b.

First insulator 20 is disposed on a bottom-surface side of first heat absorber 14. First insulator 20 is an insulator and is made of resin, for example. First insulator 20 is plate-shaped and has concavity 20a on one main surface of first insulator 20. A shape of concavity 20a corresponds to a main surface of first heat absorber 14. Concavity 20a includes opening 20b substantially in the middle. A shape of opening 20b corresponds to output terminal 10. First insulator 20 is placed on sealing plate 8 of first battery 4a with output terminal 10 inserted through opening 20b. Output terminal 10 is inserted in through-hole 14a, and the bottom-surface side of first heat absorber 14 is fit into concavity 20a. Accordingly, first insulator 20 intervenes between first heat absorber 14 and sealing plate 8 of first battery 4a. First insulator 20 thus insulates first heat absorber 14 from sealing plate 8.

Similarly, second insulator 22 is disposed on a bottom-surface side of second heat absorber 16. Second insulator 22 is an insulator and is made of resin, for example. Second insulator 22 is rectangular-plate-shaped and has concavity 22a on one main surface of second insulator 22. A shape of concavity 22a corresponds to a main surface of second heat absorber 16. Concavity 20a includes opening 22b substantially in the middle. A shape of opening 22b corresponds to output terminal 10. Second insulator 22 is placed on sealing plate 8 of second battery 4b with output terminal 10 inserted through opening 22b. Output terminal 10 is inserted in through-hole 16a, and the bottom-surface side of second heat absorber 16 is fit into concavity 22a. Accordingly, second insulator 22 intervenes between second heat absorber 16 and sealing plate 8 of second battery 4b. Second insulator 22 thus insulates second heat absorber 16 from sealing plate 8.

First insulator 20 and second insulator 22 preferably have a thermal conductivity lower than thermal conductivities of first heat absorber 14 and second heat absorber 16. This lower thermal conductivity inhibits heat transfer from first heat absorber 14 and second heat absorber 16 to batteries 4.

Main body 18 is a substantially strip-shaped member that electrically connects first heat absorber 14 to second heat absorber 16. Main body 18 is an electric conductor and is made of metal, for example. Main body 18 has first connecting part 24, second connecting part 26, and displacement absorber 28. First connecting part 24 is located at one end side of main body 18 and is electrically connected to first heat absorber 14. Second connecting part 26 is located at the other end side of main body 18 and is electrically connected to second heat absorber 16. First connecting part 24 is joined to first heat absorber 14 by welding, for example. Similarly, second connecting part 26 is joined to second heat absorber 16 by welding, for example. This results in electrical connection between first connecting part 24 and first heat absorber 14, and electrical connection between second connecting part 26 and second heat absorber 16. First connecting part 24 and second connecting part 26 have cross-section areas that can realize an allowable current required for bus bar 2. Meanwhile, first connecting part 24 and second connecting part 26 are designed so as not to become too thick in order to avoid difficulty in welding.

Displacement absorber 28 is disposed between first connecting part 24 and second connecting part 26. Displacement absorber 28 is a part that deforms in response to a relative displacement of first battery 4a and second battery 4b. That is, main body 18, or bus bar 2, is flexible in displacement absorber 28. Elastic deformation of displacement absorber 28 absorbs the relative displacement of first battery 4a and second battery 4b. At least a part of displacement absorber 28 extends in a direction intersecting stacking direction X of first battery 4a and second battery 4b as viewed from horizontal direction Y, in other words, in a direction approaching to and separating from sealing plates 8 of batteries 4. This can especially absorb a displacement in stacking direction X.

Displacement absorber 28 of the present exemplary embodiment has two first parts 28a that extend in vertical direction Z, and second part 28b that couples ends of two first parts 28a to each other. Displacement absorber 28 is thus substantially U-shaped as viewed from horizontal direction Y. Displacement absorber 28 has a cross-section area that can realize an allowable current required for bus bar 2. Meanwhile, displacement absorber 28 is designed so as not to become too thick in order to be deformable in response to the relative displacement of first battery 4a and second battery 4b. For example, displacement absorber 28 is nearly equal in thickness to first connecting part 24 and second connecting part 26. In this case, main body 18 can be formed by folding a metal sheet.

First heat absorber 14 and second heat absorber 16 have a heat capacity larger than a heat capacity of main body 18. Heat generated by a current flow in bus bar 2 accumulates mainly in first heat absorber 14 and second heat absorber 16, and discharges from first heat absorber 14 and second heat absorber 16 to the outside. In the present exemplary embodiment, first heat absorber 14 and second heat absorber 16 have a thick part that is thicker than a thickness of main body 18. This thick part realizes the heat capacity larger than the heat capacity of main body 18. As an example, first heat absorber 14 and second heat absorber 16 are wholly configured with thick parts. That is, first heat absorber 14 and second heat absorber 16 are larger in size in vertical direction Z perpendicular to stacking direction X of batteries 4, in other words, in a normal direction of sealing plate 8 than first connecting part 24 and second connecting part 26.

Main body 18 is disposed between first heat absorber 14 and second heat absorber 16. Two first parts 28a are arrayed within a space between first heat absorber 14 and second heat absorber 16 in an aligning direction of first heat absorber 14 and second heat absorber 16. First part 28a that is near first heat absorber 14 is connected to first connecting part 24 at one end of first part 28a, and is connected to second part 28b at the other end. First part 28a that is near second heat absorber 16 is connected to second connecting part 26 at one end of first part 28a, and is connected to second part 28b at the other end.

In the present exemplary embodiment, a lower end of first part 28a is connected to second part 28b, the lower end being close to battery 4. An upper end of first part 28a is connected to first connecting part 24 or second connecting part 26, the upper end being distant from battery 4. Further, first connecting part 24 is joined to an upper surface of first heat absorber 14, in other words, a main surface that is distant from first battery 4a. Second connecting part 26 is joined to an upper surface of second heat absorber 16, in other words, a main surface that is distant from second battery 4b.

Accordingly, at least a part of displacement absorber 28 overlaps first heat absorber 14 and second heat absorber 16 as viewed from stacking direction X of first battery 4a and second battery 4b. That is, at least a part of displacement absorber 28 exists within a region in vertical direction Z in which first heat absorber 14 and second heat absorber 16 extend. A lower end of second part 20b is located above lower ends of first insulator 20 and second insulator 22. Displacement absorber 28 is thus separated from sealing plates 8 of batteries 4. That is, displacement absorber 28 has no contact with battery 4 at least in an undeformed state. This can improve degree of deformation freedom of displacement absorber 28.

Figure 5:
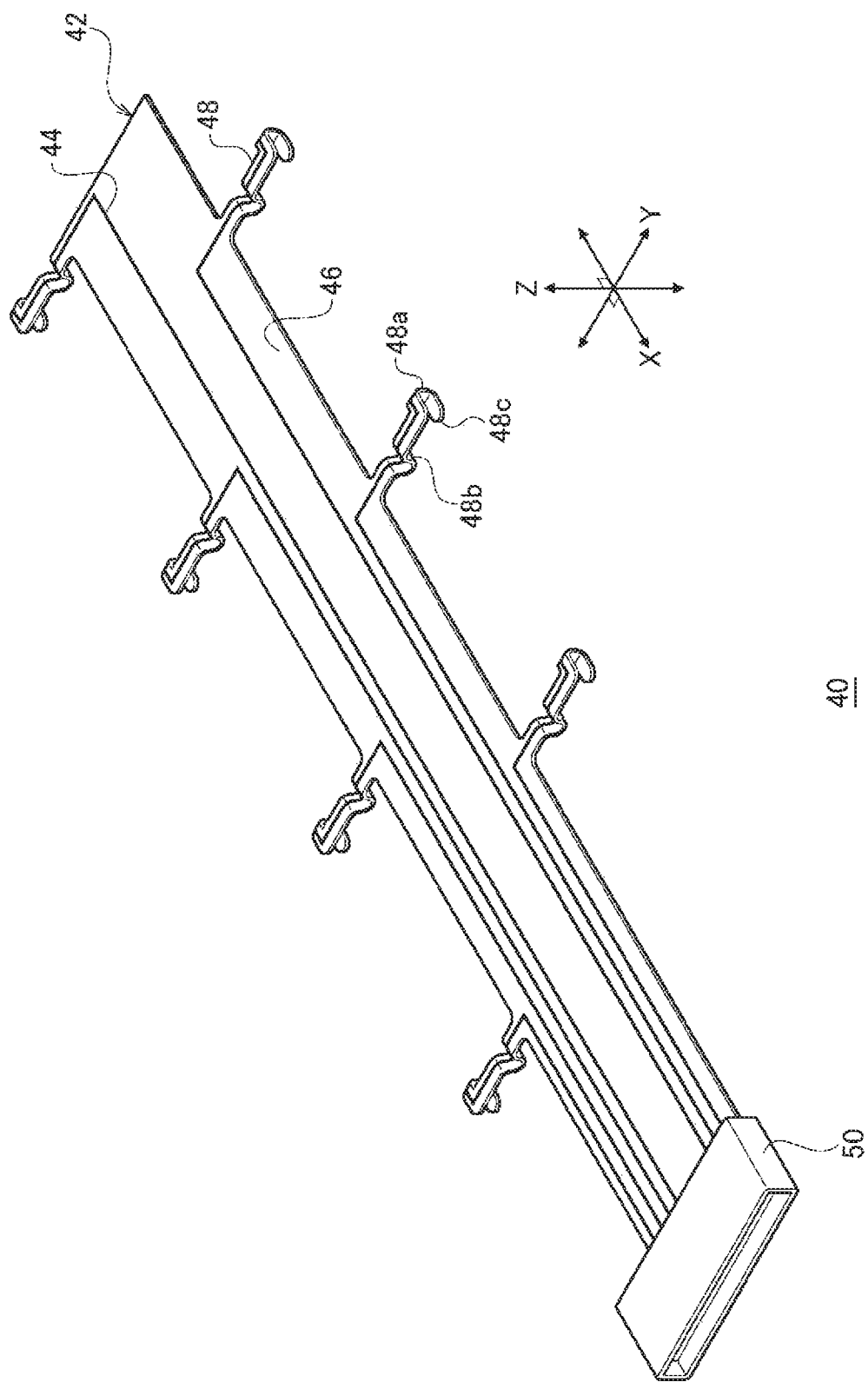
FIG. 5 is a perspective view illustrating a schematic structure of a voltage detector.

Hereinafter, voltage detector 40 will be described in detail. FIG. 5 is a perspective view illustrating a schematic structure of a voltage detector. Voltage detector 40 has substrate 42 and a plurality of voltage detection lines 44. The plurality of voltage detection lines 44 are laid on substrate 42. Substrate 42 is configured with a flexible printed substrate, for example. Substrate 42 has stem 46 and a plurality of branches 48. Stem 46 is a broad part extending along stacking direction X of batteries 4 (see FIGS. 1 and 2). Connector 50 is provided at one end of stem 46. Voltage detector 40 connects to external equipment via connector 50. The plurality of branches 48 are flat and narrower than stem 46, and extend from stem 46 toward respective displacement absorbers 28 of bus bars 2. (See FIGS. 1 and 2). A fore end of each branch 48 contacts corresponding displacement absorber 28.

As shown in FIGS. 3 and 5, each branch 48 has first part 48a, second part 48b, and third part 48c. First part 48a is a part that permits a displacement in stacking direction X of batteries 4. Specifically, first part 48a is a part extending such that two back-to-back main surfaces face substantially in stacking direction X. Second part 48b is a part that permits a displacement in a second direction perpendicular to stacking direction X. Herein, assume that the second direction is horizontal direction Y. Specifically, second part 48b is a part extending such that two back-to-back main surfaces face substantially in horizontal direction Y. Third part 48c is a part that permits a displacement in a third direction perpendicular to stacking direction X and the second direction. Herein, assume that the third direction is vertical direction Z. Specifically, third part 48c is a part extending such that two back-to-back main surfaces face substantially in vertical direction Z.

Each branch 48 protrudes from stem 46 in horizontal direction Y and convexly curves in vertical direction Z in the middle. In the present exemplary embodiment, branch 48 protrudes downward, that is, toward battery 4. This part extending in vertical direction Z constitutes second part 48b. A fore end of branch 48 protruding in horizontal direction Y extends in stacking direction X and then extends in vertical direction Z. In the present exemplary embodiment, the fore end extends downward. This part extending in vertical direction Z constitutes first part 48a. Branch 48 also has a part extending in stacking direction X from a lower end of first part 48a. This part extending in stacking direction X constitutes third part 48c. Third part 48c of branch 48 contacts displacement absorber 28. First part 48a to third part 48c exist within a zone in vertical direction Z, the region including stem 46 to sealing plate 8 of battery 4. Branch 48 preferably exists within a zone in which bus bar 2 extends in vertical direction Z.

The plurality of voltage detection lines 44 each contact displacement absorber 28 of bus bar 2. Specifically, one end of each voltage detection line 44 connects to connector 50. Each voltage detection line 44 extends from connector 50 to branch 48 via stem 46. The other end of each voltage detection line 44 extends to third part 48c of branch 48 to contact displacement absorber 28. Thus, each bus bar 2 electrically connects to connector 50 via voltage detection line 44.

As described above, bus bar 2 according to the present exemplary embodiment includes first heat absorber 14 that is joined to output terminal 10 of first battery 4a, second heat absorber 16 that is joined to output terminal 10 of second battery 4b, and main body 18 that electrically connects first heat absorber 14 to second heat absorber 16. Main body 18 has first connecting part 24 that is electrically connected to first heat absorber 14, second connecting part 26 that is electrically connected to second heat absorber 16, and displacement absorber 28 that is disposed between first connecting part 24 and second connecting part 26. Displacement absorber 28 deforms in response to a relative displacement of first battery 4a and second battery 4b. Displacement absorber 28 can thus absorb the displacement. This displacement absorption can reduce possibility of poor connection of bus bar 2 due to disconnection between main body 18 and first heat absorber 14 and/or second heat absorber 16.

First heat absorber 14 and second heat absorber 16 have a heat capacity larger than a heat capacity of main body 18. Heat generated by a current flow in bus bar 2 thus accumulates mainly in first heat absorber 14 and second heat absorber 16. First heat absorber 14 and second heat absorber 16 can thus inhibit heat generated in bus bar 2 from transferring to battery 4. This results in inhibition of deterioration in power generation performance caused by temperature rise of battery 4 due to the heat from bus bar 2. Additionally, this results in inhibition of deterioration in airtightness between the opening of sealing plate 8 and output terminal 10 caused by melting of gasket 11 that is relatively heat-labile.

Especially, in terms of electric resistance due to thickness, displacement absorber 28 is preferably smaller in thickness than other parts of bus bar 2. Bus bar 2 is thus likely to generate heat especially in displacement absorber 28. Meanwhile, first heat absorber 14 intervenes between displacement absorber 28 and output terminal 10 of first battery 4a, and second heat absorber 16 intervenes between displacement absorber 28 and output terminal 10 of second battery 4b. This can more surely inhibit temperature rise of batteries 4 due to heat generation of bus bar 2.

Accordingly, bus bar 2 of the present exemplary embodiment can maintain a stable electrical connection between batteries 4 and inhibit deterioration in power generation performance of battery 4. Such bus bar 2, when provided to battery stack 1, can improve performance of battery stack 1.

First heat absorber 14 and second heat absorber 16 have a thick part that is thicker than a thickness of main body 18. This thick part can increase the heat capacity of first heat absorber 14 and second heat absorber 16 with a simple structure. Further, at least a part of displacement absorber 28 extends in a direction intersecting stacking direction X. Consequently, displacement absorber 28 can more surely absorb a displacement in stacking direction X out of a relative displacement of adjacent batteries 4. Displacement absorber 28 is disposed such that at least a part of displacement absorber 28 overlaps first heat absorber 14 and second heat absorber 16 as viewed from stacking direction X. That is, a space in which bus bar 2 extends and that has been expanded by providing first heat absorber 14 and second heat absorber 16 is utilized for disposing displacement absorber 28. This can inhibit enlargement of bus bar 2 caused by providing first heat absorber 14, second displacement absorber 16, and displacement absorber 28.

Battery stack 1 of the present exemplary embodiment has voltage detector 40. The plurality of voltage detection lines 44 included in voltage detector 40 contact respective displacement absorbers 28 of bus bars 2. Accordingly, a contact point between voltage detector 40 and bus bar 2 can be disposed in a space between two first parts 28a of displacement absorber 28. That is, the contact point can exist within a zone in which bus bar 2 extends. This can reduce a size of battery stack 1.

Substrate 42 included in voltage detector 40 is configured with a flexible printed substrate. Thus, even if bus bar 2 displacements due to a displacement of battery 4, voltage detector 40 can let the contact point between voltage detection line 44 and bus bar 2 follow the displacement of bus bar 2. This can improve connection reliability between voltage detection line 44 and bus bar 2.

Substrate 42 has stem 46, and the plurality of branches 48 that extend from stem 46 toward respective displacement absorbers 28 of bus bars 2. Each branch 48 has first part 48a that permits a change in stacking direction X, second part 48b that permits a displacement in a second direction perpendicular to stacking direction X, and third part 48c that permits a displacement in a third direction perpendicular to stacking direction X and the second direction. This can enhance following capacity of the contact point between voltage detection line 44 and bus bar 2 with respect to a displacement of bus bar 2 in stacking direction X, the second direction, and the third direction. The connection reliability between voltage detection line 44 and bus bar 2 can thus be improved. Note that at least one of first part 48a to third part 48c can improve the connection reliability between voltage detection line 44 and bus bar 2 for a displacement of bus bar 2 in at least a part of the directions.

First part 48a to third part 48c extend within a zone in vertical direction Z, the zone including stem 46 to sealing plate 8 of battery 4. This can inhibit enlargement of battery stack 1 caused by providing first part 48a to third part 48c.

The present invention is not limited to the above-described exemplary embodiment. Modifications, such as various design changes, can be added to the exemplary embodiment based on knowledge of a person skilled in the art. The modified exemplary embodiment also falls within the scope of the present invention. A new exemplary embodiment obtained by adding modifications to the above-described exemplary embodiment has respective effects of the combined exemplary embodiment and modifications.

In the present exemplary embodiment, first heat absorber 14, second heat absorber 16, and main body 18 are configured with separate members, but may be configured with a single inseparable member. In this case, continuation of first heat absorber 14 and first connecting part 24 achieves electrical connection between first heat absorber 14 and first connecting part 24. Similarly, continuation of second heat absorber 16 and second connecting part 26 achieves electrical connection between second heat absorber 16 and second connecting part 26.

In the present exemplary embodiment, first heat absorber 14 and second heat absorber 16 are components of bus bar 2. However, bus bar 2 is not particularly limited to this configuration. First heat absorber 14 and second heat absorber 16 have only to be joined to output terminal 10 of battery 4, and thus, may be regarded as components of battery 4. In this case, bus bar 2 is configured with just main body 18. Accordingly, the present invention may include the following mode.

Battery stack 1 comprising:
a plurality of batteries 4 that are stacked;
first heat absorber 14 and second heat absorber 16 that are respectively joined to output terminal 10 of first battery 4a and output terminal 10 of second battery 4b, first battery 4a and second battery 4b being adjacent batteries out of the plurality of batteries 4; and
bus bar 2 (main body 18) that electrically connects first heat absorber 14 to second heat absorber 16,
wherein first heat absorber 14 and second heat absorber 16 have a heat capacity larger than a heat capacity of bus bar 2, and
bus bar 2 has first connecting part 24 that is electrically connected to first heat absorber 14, second connecting part 26 that is electrically connected to second heat absorber 16, and displacement absorber 28 that is disposed between first connecting part 24 and second connecting part 26 and deforms in response to a relative displacement of first battery 4a and second battery 4b.

In the exemplary embodiment described above, battery 4 is a prismatic battery. However, a shape of battery 4 is not particularly limited and may be cylindrical, for example. A number of batteries 4 included in battery stack 1 is also not particularly limited. Moreover, exterior can 6 may be covered with an insulating sheet, such as a shrink tube.

The invention claimed is:

1. A battery stack comprising:
a bus bar; and
a plurality of batteries that are electrically connected to each other via the bus bar and includes a first battery and a second battery disposed adjacent to the first battery, wherein:
the bus bar comprises:
a first heat absorber that is joined to an output terminal of the first battery;
a second heat absorber that is joined to an output terminal of the second battery; and
a main body that electrically connects the first heat absorber to the second heat absorber,
the first heat absorber and the second heat absorber have a heat capacity larger than a heat capacity of the main body,
the battery stack further comprises a first insulator disposed between the first heat absorber and the first battery and a second insulator disposed between the second heat absorber and the second battery,
the main body has a first connecting part that is welded to a surface of the first heat absorber to be electrically connected to the first heat absorber, a second connecting part that is welded to a surface of the second heat absorber to be electrically connected to the second heat absorber, and a displacement absorber that is disposed between the first connecting part and the second connecting part and deforms in response to a relative displacement of the first battery and the second battery,
the first insulator and the second insulator have a thermal conductivity lower than thermal conductivities of the first heat absorber and the second heat absorber, each of the first insulator and the second insulator has a recess and an opening formed in a bottom portion of the recess, the output terminal of the first battery is inserted through the opening of the first insulator, the output terminal of the second battery is inserted through the opening of the second insulator, the first heat absorber is accommodated in the recess of first insulator, and the second heat absorber is accommodated in the recess of the second insulator.

2. The battery stack according to claim 1, wherein the first heat absorber and the second heat absorber have a thick part that is thicker than a thickness of the main body.

3. The battery stack according to claim 1, wherein at least a part of the displacement absorber extends in a direction intersecting a stacking direction of the first battery and the second battery.

4. The battery stack according to claim 3, wherein at least a part of the displacement absorber overlaps the first heat absorber and the second heat absorber as viewed from the stacking direction of the first battery and the second battery.

5. The battery stack according to claim 1, wherein the displacement absorber is bent downwardly from the first connecting part and the second connecting part.

6. The battery stack according to claim 1, further comprising a voltage detector that has a plurality of voltage detection lines and detects voltages of the plurality of batteries, wherein the plurality of voltage detection lines each contact one of a plurality of the displacement absorbers of a plurality of the bus bars.

7. The battery stack according to claim 6, wherein the voltage detector has a substrate for the plurality of voltage detection lines to be laid on, and the substrate has a stem, and a plurality of branches that extend from the stem toward the respective displacement absorbers of the bus bars.

8. The battery stack according to claim 7, wherein each of the branches has at least one of a first part that permits a displacement in a stacking direction of the batteries, a second part that permits a displacement in a second direction perpendicular to the stacking direction, and a third part that permits a displacement in a third direction perpendicular to the stacking direction and the second direction.

9. A battery stack comprising:

a plurality of batteries that are stacked;

a first heat absorber and a second heat absorber that are respectively joined to an output terminal of a first battery and an output terminal of a second battery, the first battery and the second battery being adjacent batteries out of the plurality of batteries; and a bus bar that electrically connects the first heat absorber to the second heat absorber, wherein:

the first heat absorber and the second heat absorber have a heat capacity larger than a heat capacity of the bus bar, the bus bar has a first connecting part that is welded to a surface of the first heat absorber to be electrically connected to the first heat absorber, a second connecting part that is welded to a surface of the second heat absorber to be electrically connected to the second heat absorber, and a displacement absorber that is disposed between the first connecting part and the second connecting part and deforms in response to a relative displacement of the first battery and the second battery, and each of the first heat absorber and the second heat absorber has an opening into which the output terminal is inserted.

10. A battery stack comprising:

a plurality of batteries that are stacked;

a first heat absorber and a second heat absorber that are respectively joined to an output terminal of a first battery and an output terminal of a second battery, the first battery and the second battery being adjacent batteries out of the plurality of batteries; and a bus bar that electrically connects the first heat absorber to the second heat absorber, wherein:

the first heat absorber and the second heat absorber have a heat capacity larger than a heat capacity of the bus bar, the bus bar has a first connecting part that is welded to a surface of the first heat absorber to be electrically connected to the first heat absorber, a second connecting part that is welded to a surface of the second heat absorber to be electrically connected to the second heat absorber, and a displacement absorber that is disposed between the first connecting part and the second connecting part and deforms in response to a relative displacement of the first battery and the second battery, and the first connecting part is welded to an uppermost surface of the first heat absorber and the second connecting part is welded to an uppermost surface of the second heat absorber.

* * * * *